(12) United States Patent
Ichiyama et al.

(10) Patent No.: US 7,801,211 B2
(45) Date of Patent: Sep. 21, 2010

(54) COMMUNICATION SYSTEM, RECEIVER UNIT, AND ADAPTIVE EQUALIZER

(75) Inventors: Kiyotaka Ichiyama, Tokyo (JP); Masahiro Ishida, Tokyo (JP)

(73) Assignee: Advantest Corporation, Tokyo (JP)

( * ) Notice: Subject to any disclaimer, the term of this patent is extended or adjusted under 35 U.S.C. 154(b) by 663 days.

(21) Appl. No.: 11/763,451

(22) Filed: Jun. 15, 2007

(65) Prior Publication Data

US 2008/0310489 A1    Dec. 18, 2008

(51) Int. Cl.
*H03H 7/40* (2006.01)

(52) U.S. Cl. .................. 375/232; 375/136; 375/147; 375/226; 375/229; 375/350; 375/346; 375/254

(58) Field of Classification Search .......... 375/232, 375/136, 147, 226, 229, 350, 346, 254
See application file for complete search history.

(56) References Cited

U.S. PATENT DOCUMENTS

| | | | |
|---|---|---|---|
| 5,838,744 A * | 11/1998 | Zheng | 375/355 |
| 5,848,036 A * | 12/1998 | Ishibashi et al. | 369/44.29 |
| 7,620,101 B1 * | 11/2009 | Jenkins | 375/240 |
| 7,623,830 B2 * | 11/2009 | Rofougaran | 455/73 |
| 2005/0063268 A1 * | 3/2005 | Ninomiya | 369/47.53 |
| 2006/0193307 A1 * | 8/2006 | Tomita | 370/350 |

FOREIGN PATENT DOCUMENTS

JP    2005-292004    10/2005

* cited by examiner

*Primary Examiner*—Shuwang Liu
*Assistant Examiner*—Dhaval Patel
(74) *Attorney, Agent, or Firm*—Jianq Chyun IP Office

(57) ABSTRACT

A communication system in which a signal is transferred includes a transmitter that transmits a signal, a receiver that receives a signal transmitted thereto, and an adaptive equalizer that generates a compensated signal by compensating degradation of the signal to be received by the receiver. The adaptive equalizer includes a signal compensating section that generates the compensated signal by passing therethrough the signal to be received by the receiver, a jitter measuring section that measures jitter of the compensated signal output from the signal compensating section, and an adjusting section that adjusts a characteristic of the signal compensating section so as to reduce the jitter of the compensated signal which is measured by the jitter measuring section.

10 Claims, 14 Drawing Sheets

COMMUNICATION SYSTEM, RECEIVER UNIT, AND ADAPTIVE EQUALIZER

BACKGROUND

1. Technical Field

The present invention relates to a communication system, a receiver, and an adaptive equalizer. More particularly, the present invention relates to an adaptive equalizer which compensates signal degradation caused by a transmission path or the like.

2. Related Art

In the serial communication and other fields, an equalizer is used which compensates signal degradation caused by a transmission path. The equalizer is a circuit for compensating degradation of a transmission signal in terms of amplitude and timing which is caused by, for example, the amplitude and delay characteristics of the transmission path, as disclosed in, for example, Unexamined Japanese Patent Application Publication No. 2005-292004.

When transmitted out from a transmitter, a data signal may have a large eye opening at the output end of the transmitter. However, the data signal may have a small eye opening at the input end of a receiver after transmitted through a transmission path. For example, when the transmission path has low pass filter characteristics, the higher-frequency components of the data signal experience a larger decrease in amplitude, which changes the phase of the data signal. Therefore, the waveform of the data signal which is observed at the input end of the receiver is deformed. To deal with this issue, an equalizer which has predetermined filter characteristics is utilized. The equalizer can make compensation for the amplitude and delay characteristics of the transmission path. As a result, the data signal input into the receiver can have a large eye opening.

Here, each transmission path has different amplitude and delay characteristics. This means that the filter characteristics of the equalizer can not be uniquely determined. To deal with this issue, an adaptive equalizer which is capable of automatically adjusting the filter characteristics thereof may be utilized.

FIG. 13 illustrates an exemplary configuration of an adaptive equalizer 200. The adaptive equalizer 200 includes therein a filter 210, a level comparing section 220, a signal generating section 230, a subtracting section 240, a switch 260, and an adjusting section 250.

The filter 210 has predetermined filter characteristics. The filter 210 passes a received input signal therethrough. The adjusting section 250 adjusts the filter characteristic of the filter 210. For example, the adjusting section 250 causes a transmitter to transmit a known input signal to the filter 210. Here, the adjusting section 250 causes the signal generating section 230 to generate the same signal as the known input signal.

The subtracting section 240 receives the signal generated by the signal generating section 230, and the input signal which has passed through the filter 210. The subtracting section 240 obtains the difference between these two signals, and inputs the obtained difference into the adjusting section 250.

The adjusting section 250 adjusts the characteristics of the filter 210 so that the value of the difference received from the subtracting section 240 becomes equal to substantially zero. In other words, the adjusting section 250 adjusts the characteristics of the filter 210 in such a manner that the signal which has passed through the filter 210 becomes substantially equivalent to the known input signal. In this way, the adaptive equalizer 200 can compensate the signal degradation caused by the transmission path.

By performing the above-described adjusting procedure, for example, at the start-up of a communication system, the characteristics of the filter 210 can be adjusted in advance in accordance with the characteristics of the transmission path. Also, while the communication system is actually operating, the characteristics of the filter 210 can be adjusted in accordance with the change in the amplitude and delay characteristics of the transmission path which is caused by, for example, a change in the temperature, in such a manner that the switch 260 causes the signal output from the level comparing section 220 to be input into the subtracting section 240.

Here, the adaptive equalizer 200 shown in FIG. 13 requires the signal generating section 230 which generates the known input signal. Also, since the two signals input into the subtracting section 240 are transferred through different paths, there is a difference between the phases of the two signals input into the subtracting section 240. Therefore, the adjusting section 250 inevitably sets the characteristics of the filter 210 based on the value including the error corresponding to the difference between the phases.

SUMMARY

In view of the above, an advantage of some embodiments of the present invention is to provide a communication system, a receiver, and an adaptive equalizer which can solve the above-mentioned problems. This advantage is achieved by combining the features recited in the independent claims. The dependent claims define further effective specific example of the present invention.

A first embodiment of the present invention provides a communication system in which a signal is transferred. The communication system includes a transmitter that transmits a signal, a receiver that receives a signal transmitted thereto, and an adaptive equalizer that generates a compensated signal by compensating degradation of the signal to be received by the receiver. The adaptive equalizer includes a signal compensating section that generates the compensated signal by passing therethrough the signal to be received by the receiver, a jitter measuring section that measures jitter of the compensated signal output from the signal compensating section, and an adjusting section that adjusts a characteristic of the signal compensating section so as to reduce the jitter of the compensated signal which is measured by the jitter measuring section.

A second embodiment of the present invention provides a receiver for use in a communication system in which a signal is transferred. The receiver includes an adaptive equalizer that generates a compensated signal by compensating degradation of a received signal, and an operating circuit that operates in accordance with the adaptive equalizer. The adaptive equalizer includes a signal compensating section that generates the compensated signal by passing therethrough the received signal, a jitter measuring section that measures jitter of the compensated signal output from the signal compensating section, and an adjusting section that adjusts a characteristic of the signal compensating section so as to reduce the jitter of the compensated signal which is measured by the jitter measuring section.

A third embodiment of the present invention provides a communication system in which a signal is transferred. The communication system includes a transmitter that transmits a signal, a receiver that receives a signal transmitted thereto, and an adaptive equalizer that compensates in advance the signal output from the transmitter in terms of degradation which is to be caused by a transmission path. The adaptive equalizer includes a signal compensating section that generates a compensated signal by passing therethrough the signal output from the transmitter so as to compensate in advance the degradation, a jitter measuring section that measures jitter of the compensated signal received by the receiver, and an adjusting section that adjusts a characteristic of the signal compensating section so as to reduce the jitter of the compensated signal which is measured by the jitter measuring section.

A fourth embodiment of the present invention provides an adaptive equalizer that generates a compensated signal by compensating degradation of a received signal. The adaptive equalizer includes a signal compensating section that generates the compensated signal by passing therethrough the received signal, a jitter measuring section that measures jitter of the compensated signal output from the signal compensating section, and an adjusting section that adjusts a characteristic of the signal compensating section so as to reduce the jitter of the compensated signal which is measured by the jitter measuring section.

A fifth embodiment of the present invention provides an adaptive equalizer that generates a compensated signal by compensating in advance degradation of a signal to be transmitted. The adaptive equalizer includes a signal compensating section that generates the compensated signal by passing therethrough the signal to be transmitted, a jitter measuring section that measures jitter of the compensated signal received by a receiver, and an adjusting section that adjusts a characteristic of the signal compensating section so as to reduce the jitter of the compensated signal which is measured by the jitter measuring section.

Here, all the necessary features of the present invention are not listed in the summary. The sub-combinations of the features may become the invention.

DESCRIPTION OF EXEMPLARY EMBODIMENT

Hereinafter, one aspect of the present invention will be described through an embodiment. The embodiment does not limit the invention according to the claims, and all the combinations of the features described in the embodiment are not necessarily essential to means provided by aspects of the invention.

Figure 1:
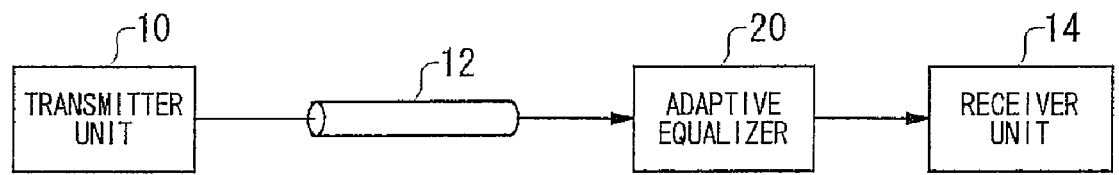
FIG. 1 illustrates an exemplary configuration of a communication system 100 relating to an embodiment of the present invention.

FIG. 1 illustrates an exemplary configuration of a communication system 100 relating to an embodiment of the present invention. The communication system 100 transfers therein signals including a data signal and a clock signal. The communication system 100 may perform wired or wireless signal transfer. The communication system 100 may be a circuit for transferring the signals within a circuit board of a semiconductor chip or the like. The communication system 100 includes therein a transmitter 10, an adaptive equalizer 20, and a receiver 14.

The transmitter 10 transmits a signal to the receiver 14. The transmitter 10 may transmit the signal via a transmission path 12 provided between the transmitter 10 and the receiver 14. The transmission path 12 may be a path for wired communication such as a cable and a wire, or a path for wireless communication such as a space.

The adaptive equalizer 20 generates a compensated signal by compensating the degradation of the signal which is to be received by the receiver 14. According to this example, the adaptive equalizer 20 is provided between the transmission path 12 and the receiver 14, so as to receive the signal which has been degraded by the transmission path 12 and input the compensated signal which is obtained by compensating the signal degradation into the receiver 14. The adaptive equalizer 20 may be provided in the vicinity of the input end of the receiver 14, or within the receiver 14.

The receiver 14 receives a signal transmitted thereto. According to this example, the receiver 14 receives the compensated signal which is obtained by the adaptive equalizer 20 which compensates the degradation. With the above-described configuration, the receiver 14 can receive a signal which is obtained by compensating the signal degradation caused by the transmission path 12.

Figure 2:
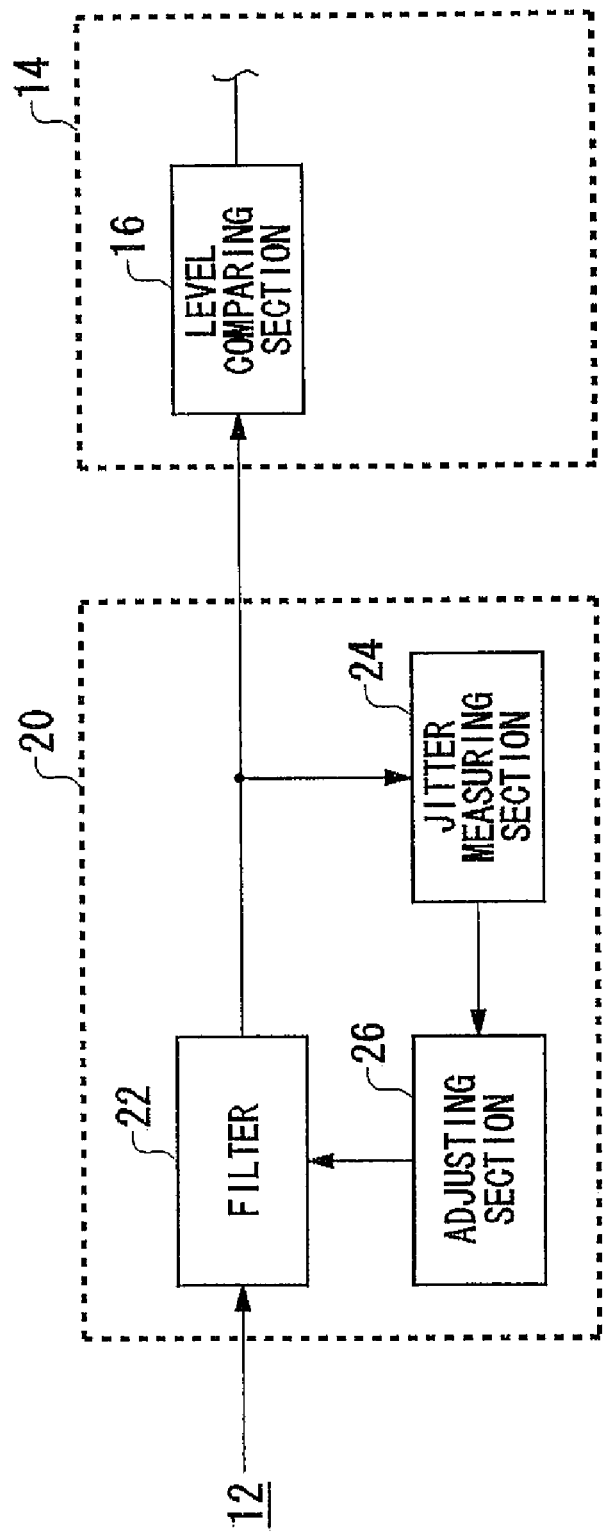
FIG. 2 illustrates exemplary configurations of an adaptive equalizer 20 and a receiver 14.

FIG. 2 illustrates exemplary configurations of the adaptive equalizer 20 and the receiver 14. The adaptive equalizer 20 includes therein a filter 22, a jitter measuring section 24, and an adjusting section 26. Here, the filter 22 is shown as an example of a signal compensating section. The filter 22 has predetermined filter characteristics. The filter 22 outputs the compensated signal by passing therethrough the signal which is transmitted through the transmission path 12.

The filter characteristics of the filter 22 may indicate, for example, a gain between the input and output of the filter 22 for each frequency component. To be specific, the filter 22 may be a circuit which amplifies or attenuates each frequency component of the signal input thereto in accordance with the predetermined filter characteristics. The compensated signal output from the filter 22 is input into the receiver 14.

The receiver 14 includes therein a level comparing section 16, for example. The level comparing section 16 compares the level of the compensated signal output from the filter 22 with a predetermined reference level, to convert the compensated signal into a binary digital signal. The receiver 14 relating to this example may be a circuit which operates in accordance with digital signals.

The jitter measuring section 24 is disposed in parallel with the receiver 14 with respect to the filter 22. The jitter measuring section 24 thus receives the compensated signal which is transmitted from the filter 22 to the receiver 14. Here, the jitter measuring section 24 measures jitter of the received compensated signal. For example, the jitter measuring section 24 may measure timing jitter and period jitter of the compensated signal. Here, the timing jitter may indicate, for example, a difference between each edge timing of the compensated signal and a corresponding ideal edge timing, and the period jitter may indicate a difference in terms of the value of timing jitter between adjacent edges of the compensated signal.

The adjusting section 26 adjusts the characteristics of the filter 22 so as to reduce the jitter of the compensated signal which is measured by the jitter measuring section 24. Here, for example, the jitter measuring section 24 may calculate the RMS value of the jitter of the compensated signal at predetermined intervals. The adjusting section 26 may sequentially vary the gain for each frequency component which passes through the filter 22 in such a manner as to reduce the calculated RMS value.

The signal degradation in terms of timing which is caused by the transmission path 12 is represented as the jitter of the signal. Therefore, the timing degradation caused by the transmission path 12 can be compensated in such a manner that the adjusting section 26 adjusts the characteristics of the filter 22 so as to reduce the jitter measured by the jitter measuring section 24.

Figure 3:
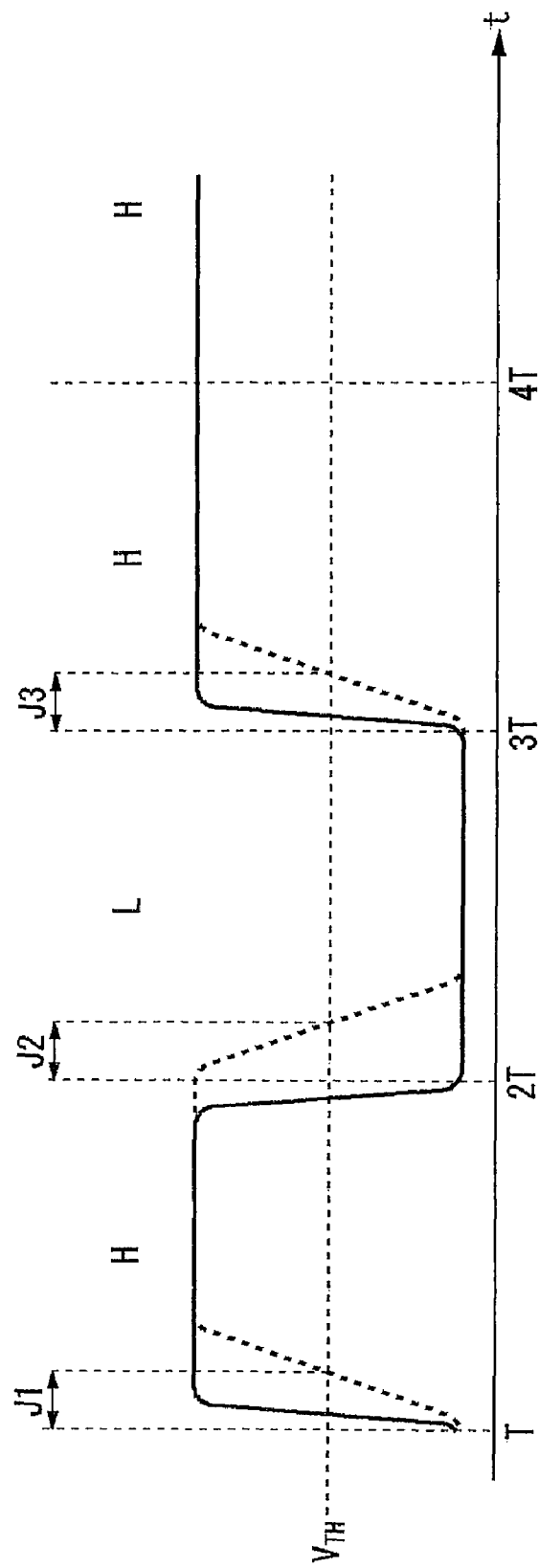
FIG. 3 illustrates exemplary waveforms of a signal input into a filter 22 and a compensated signal output from the filter 22.

FIG. 3 illustrates exemplary waveforms of the signal input into the filter 22 and the compensated signal output from the filter 22. According to this example, the input signal is a data signal which has a predetermined logical pattern (HLHH . . . ). In FIG. 3, the solid line indicates the waveform of the compensated signal, and the dotted line indicates the waveform of the signal input into the filter 22.

Further referring to FIG. 3, $V_{TH}$ indicates a threshold voltage used to determine the logical value of each bit of the signal, and T, 2T, 3T, . . . each indicate an ideal timing of a boundary between bits of the input signal.

As mentioned above, the timing of the signal input into the filter 22 is degraded by, for example, the delay characteristics of the transmission path 12. The timing degradation can be measured as the timing jitter (J1, J2, J3, . . . ) of each edge timing of the signal.

The jitter measuring section 24 may measure the timing jitter of the compensated signal. This operation may be performed in the following manner, for example. The jitter measuring section 24 may detect the edge timings of the compensated signal by sampling the compensated signal. Here, the jitter measuring section 24 is supplied in advance with an ideal period of the signal input into the adaptive equalizer 20 (when the input signal is a data signal, an ideal bit interval is supplied). The jitter measuring section 24 may calculate the timing jitter based on the difference between each of the detected edge timings and a corresponding ideal timing.

The adjusting section 26 adjusts the gain of the filter 22 for each frequency component in such a manner as to reduce the timing jitter which is measured by the jitter measuring section 24, for example. Here, the magnitude of the timing jitter is largely determined by the attenuation of the higher-frequency components which is caused by the transmission path 12. The larger the value of the timing jitter which is measured by the jitter measuring section 24 is, the larger values the adjusting section 26 may assign to the gains of the filter 22 for predetermined higher-frequency components. The adjusting section 26 may adjust the filter characteristics of the filter 22 so that the result of multiplying together the frequency characteristics of the transmission path 12 and the frequency characteristics of the filter 22 has a substantially flat characteristic.

The filter 22 may be a digital filter. For example, the filter 22 may obtain a data sequence by sampling the input signal at predetermined intervals. Furthermore, each data value in the data sequence is sequentially transmitted to the predetermined number of cascaded taps at predetermined cycles. In each cycle, the filter 22 may calculate the value of the compensated signal in the cycle based on the total sum of the values each of which is obtained by multiplying together the data value stored on one of the taps and the gain assigned to the tap. The adjusting section 26 may adjust the gain of each tap so as to reduce the value of the timing jitter measured by the jitter measuring section 24. The adjusting section 26 may adjust the phase of the filter 22 for each frequency component, or may adjust the gain and phase of the filter 22 for each frequency component.

As another example, the signal compensating section may be alternatively a circuit that generates the compensated signal by superposing, onto the input signal, a correcting component associated with the input signal. For example, the signal compensating section may be a circuit that superposes the differential waveform of the input signal at a predetermined gain. The adjusting section 26 may adjust the gain for the differential waveform so as to reduce the jitter measured by the jitter measuring section 24. The signal compensating section can be configured by using a circuit known as an equalizer.

For example, a pre-emphasis circuit is known as an equalizer to be provided on the transmitter. The amplitude of the signal output from the pre-emphasis circuit is made larger when the value of the signal to be transmitted from the transmitter is going to vary than when the value of the signal is not going to vary. Also, a de-emphasis circuit is known as an equalizer to be provided on the transmitter. The amplitude of the signal output from the de-emphasis circuit is made smaller when the value of the signal to be transmitted from the transmitter is not going to vary than when the value of the signal is going to vary.

Figure 13:
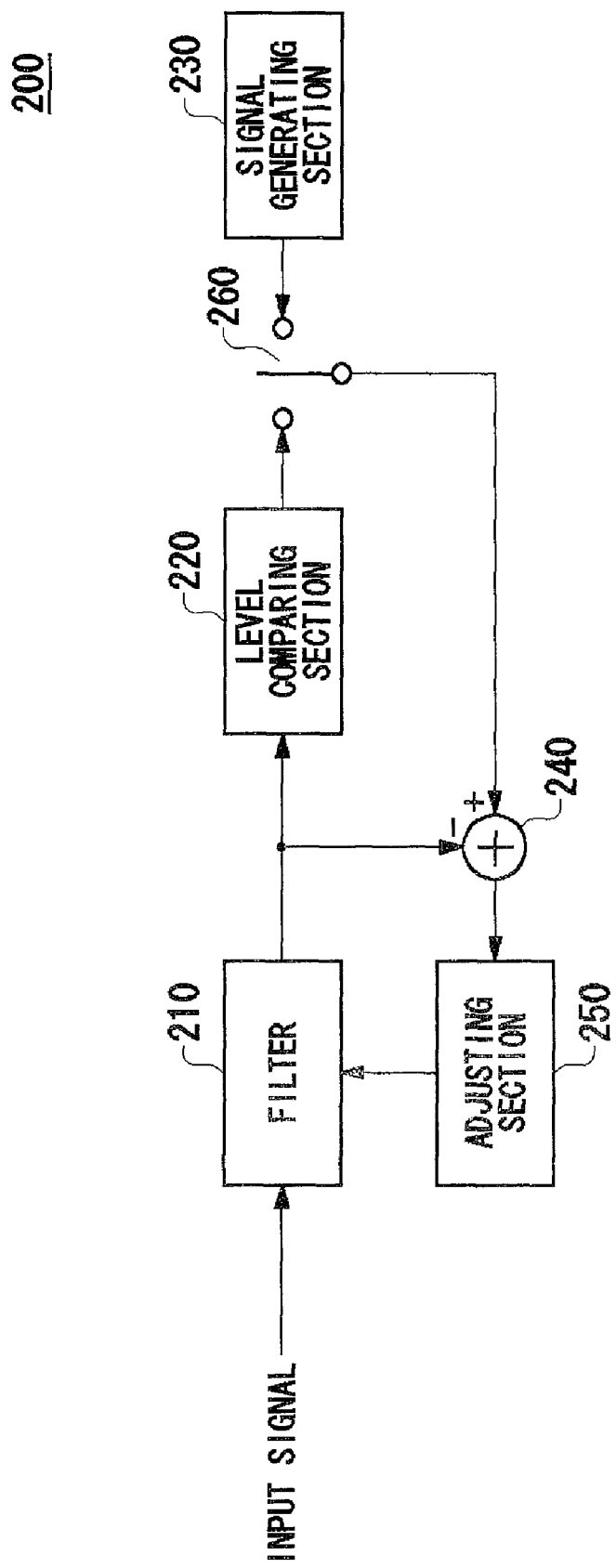
FIG. 13 illustrates an exemplary configuration of an adaptive equalizer 200.

Operating in the above-described manner, the adaptive equalizer 20 can generate the compensated signal, which is indicated by the waveform of the solid line in FIG. 3, by compensating the timing degradation. Also, the adaptive equalizer 20 does not have the problem of the error caused by the skew which is observed at the adaptive equalizer 200 shown in FIG. 13. Therefore, the adaptive equalizer 20 can compensate the timing degradation more accurately. As a result, the adaptive equalizer 20 can accurately transmit, to the receiver 14, the signal generated by the transmitter 10.

Figure 4:
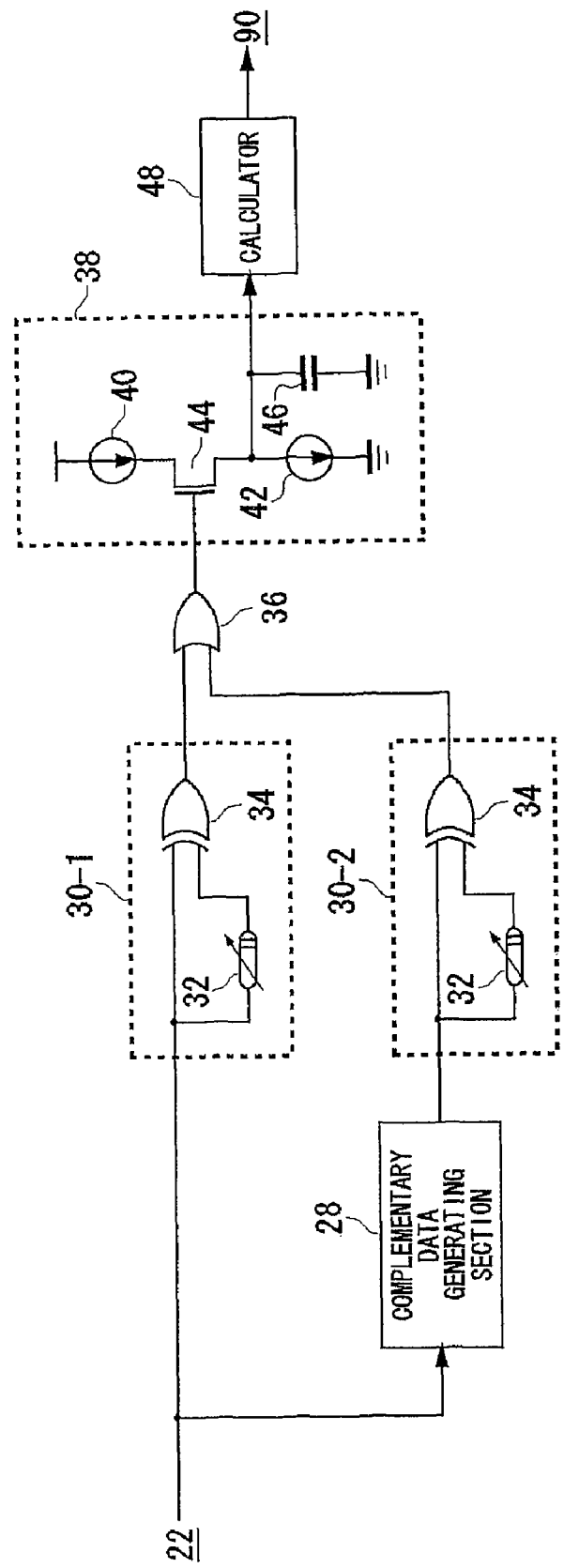
FIG. 4 illustrates an exemplary configuration of a jitter measuring section 24.

FIG. 4 illustrates an exemplary configuration of the jitter measuring section 24. According to this example, the jitter measuring section 24 is configured so as to be capable of measuring jitter of a data signal. The jitter measuring section 24 includes therein a complementary data generating section 28, a first pulse generator 30-1, a second pulse generator 30-2, a logical OR circuit 36, an integrator 38, and a calculator 48.

Figure 5:
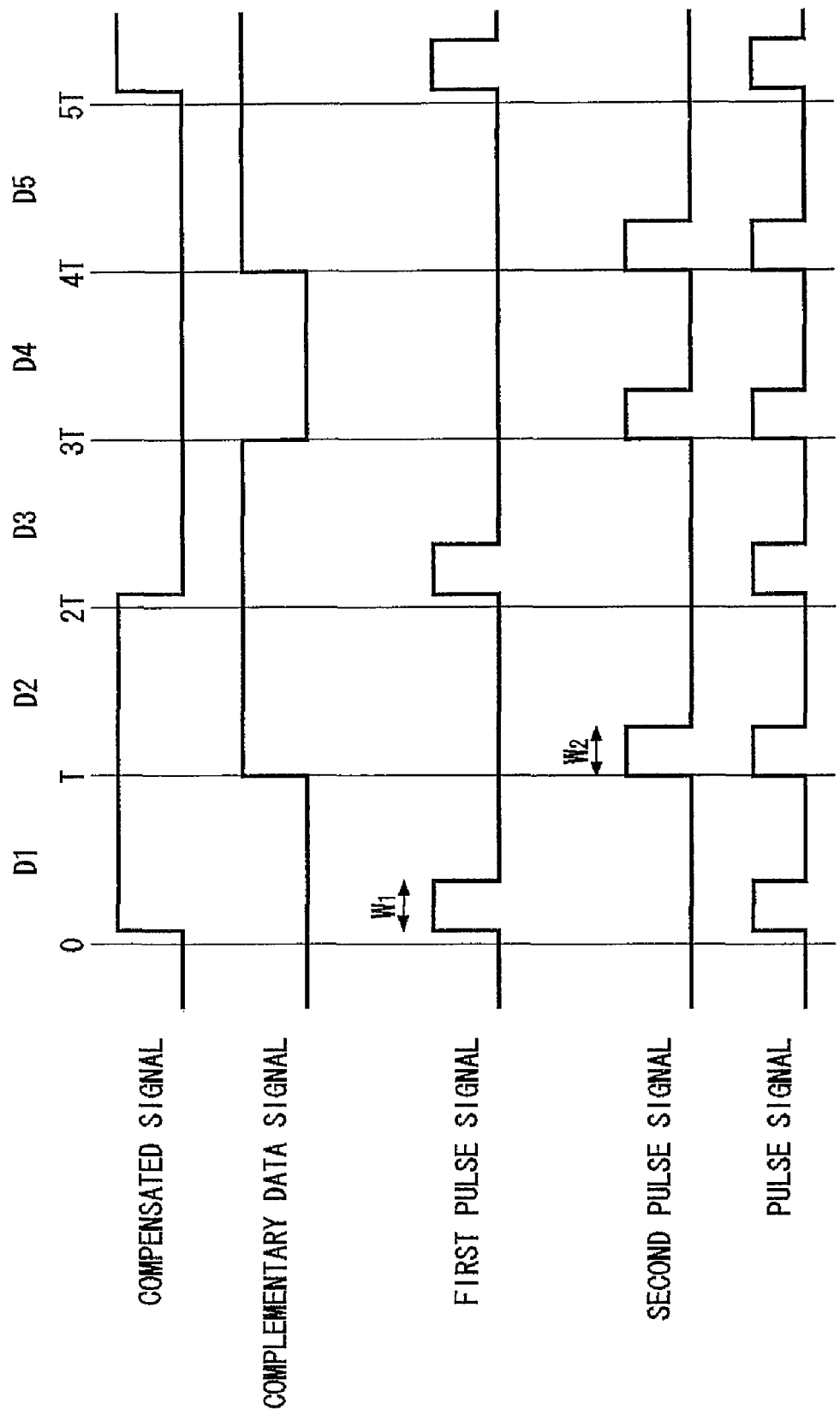
FIG. 5 is a timing chart illustrating exemplary operations performed by a complementary data generating section 28, a first pulse generator 30-1, a second pulse generator 30-2, and a logical OR circuit 36, which partly constitute the jitter measuring section 24 shown in FIG. 4.

FIG. 5 is a timing chart illustrating exemplary operations performed by the complementary data generating section 28, the first pulse generator 30-1, the second pulse generator 30-2, and the logical OR circuit 36, which partly constitute the jitter measuring section 24 shown in FIG. 4. The complementary data generating section 28 generates a complementary data signal for the compensated signal output from the filter 22.

Here, the complementary data signal is a signal having an edge at each boundary (0, T, 2T, 3T, . . . ) between the data intervals (D1, D2, D3, . . . ) of the compensated signal under a condition that the data value of the compensated signal does not transit at the boundary between the data intervals, as shown in FIG. 5. For example, the complementary data signal is such a signal that, when the ideal edges of the compensated signal and the edges of the complementary data signal are aligned along the same time axis, these aligned edges are arranged at an interval equal to the bit interval of the compensated signal.

Here, the data interval of the compensated signal indicates a time period for which one independent piece of data is maintained in the compensated signal when the compensated signal is serially transmitted, for example. When the compensated signal is subjected to a value multiplexing process and then transmitted, the data interval of the compensated signal may indicate a time period for which the symbol data is maintained. In other words, the data interval may be the bit interval or symbol interval of the compensated signal.

The first pulse generator 30-1 detects the edge of the compensated signal, and outputs a first pulse signal having a predetermined pulse width W1 in accordance with the detected edge. Which is to say, the edge of the first pulse signal contains the timing jitter of the edge of the compensated signal.

The second pulse generator 30-2 detects the edge of the complementary data signal, and outputs a second pulse signal having a predetermined pulse width W2 in accordance with the detected edge. Similarly, the edge of the second pulse signal contains the timing jitter of the complementary data signal. It should be noted here that the timing jitter of the complementary data signal may be substantially zero. Here, it is preferable that the pulse widths W1 and W2 of the first and second pulse signals are substantially equal to each other.

The first and second pulse generators 30-1 and 30-2 may each include therein a delay circuit 32 and a logical XOR circuit 34. The delay circuits 32 receive the signals input into the pulse generators 30, and delay the received signals. The logical XOR circuits 34 output logical XORs between the signals input into the pulse generators 30 and the delayed signals output from the delay circuits 32.

In this way, the logical XOR circuits 34 output pulses having pulse widths corresponding to the delay amounts of the delay circuits 32 at each rising edge of the signals input into the pulse generators. Here, the delay amounts of the delay circuits 32 of the first and second pulse generators 30-1 and 30-2 may be the same.

The logical OR circuit 36 outputs a logical OR between the first and second pulse signals. In this way, the logical OR circuit 36 can output a pulse signal which has pulses arranged at substantially the same intervals and contains the timing jitter of the compensated signal.

Figure 6:
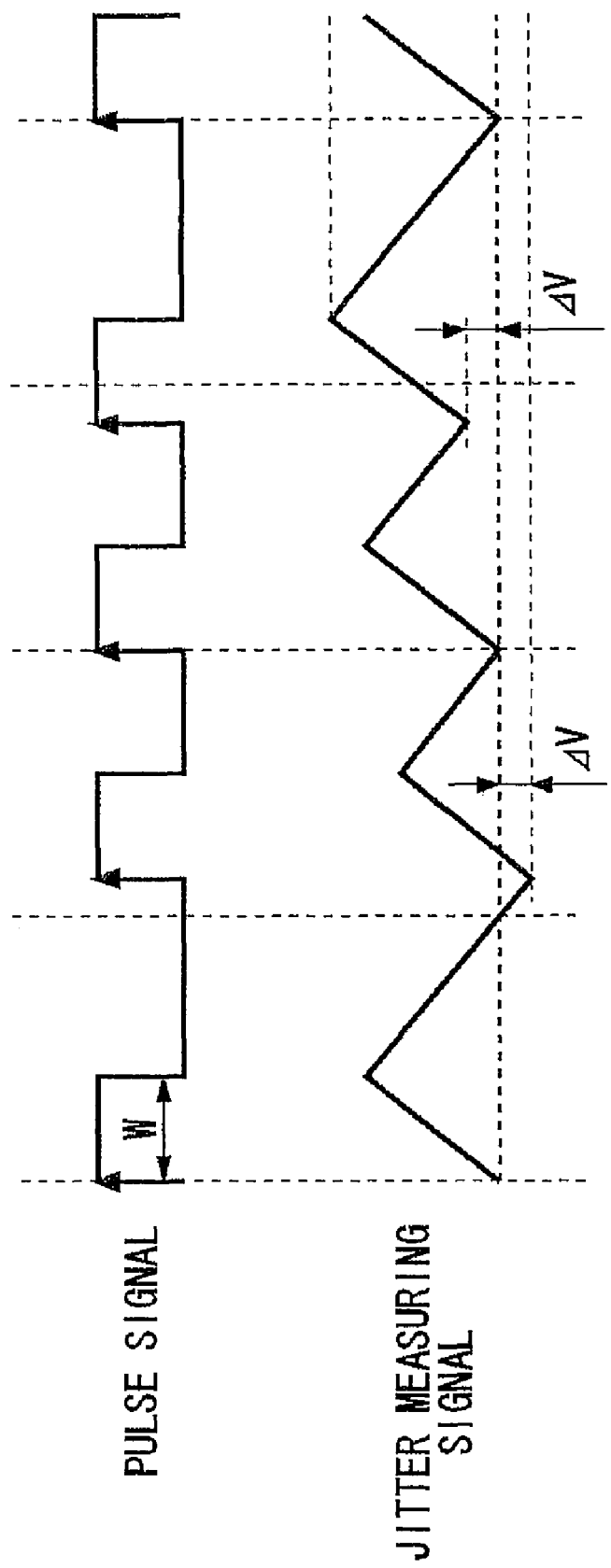
FIG. 6 illustrates an exemplary operation of an integrator 38 which partly constitutes the jitter measuring section 24 shown in FIG. 4.

FIG. 6 illustrates an exemplary operation of the integrator 38 which partly constitutes the jitter measuring section 24 shown in FIG. 4. The integrator 38 receives the pulse signal shown in FIG. 5. The integrator 38 integrates the pulse signal. For example, the integrator 38 integrates the pulse signal, to output a jitter measuring signal having a triangular waveform as shown in FIG. 6.

The integrator 38 outputs the jitter measuring signal the level of which increases at a predetermined increasing rate while the input pulse signal indicates the H logic and decreases at a predetermined decreasing rate while the input pulse signal indicates the L logic. As shown in FIG. 4, the integrator 38 includes therein a source current source 40, a current sink 42, a capacitor 46, and a charge/discharge control section 44. The current source 40 generates a source current which specifies the increasing rate of the jitter measuring signal, and the current sink 42 generates a sinking current which specifies the decreasing rate of the jitter measuring signal.

The capacitor 46 is charged and discharged by means of the source current and sink current sources 40 and 42, to generate the voltage level of the jitter measuring signal. The charge/discharge control section 44 charges the capacitor 46 by using the source current while the pulse signal indicates the H logic, and discharges the capacitor 46 by using a current obtained by subtracting the sink current from the source current while the pulse signal indicates the L logic.

Operating in the above-described manner, the integrator 38 can generate the jitter measuring signal shown in FIG. 6. The source and sink current values are adjusted in advance in such a manner that, when the timing jitter of the compensated signal is zero, the local maximal and minimal values of the jitter measuring signal respectively take constant values.

For example, the source and sink current values may be adjusted in advance in such a manner that, when the signal input into the receiver 14 has not passed through the transmission path 12 and therefore has no jitter, the local maximal and minimal values of the jitter measuring signal respectively take constant values. The adjusting section 26 may adjust the characteristics of the filter 22 so that, when the signal from the transmitter 10 is input into the receiver 14, the local maximal and minimal values of the jitter measuring signal respectively take constant values.

When the timing jitter of the compensated signal is not zero, the local maximal and minimal values of the jitter measuring signal do not take constant values as shown in FIG. 6. For example, there is a difference ΔV between the local minimal value of the jitter measuring signal and a local minimal value which is observed when the timing jitter of the compensated signal is zero. The difference ΔV corresponds to the timing jitter of the compensated signal. In other words, the integrator 38 charges or discharges the capacitor 46 in accordance with the logical value of the pulse signal so as to convert the timing jitter observed in the time axis into information represented in the voltage axis. In this way, the timing jitter can be observed more easily.

The calculator 48 calculates the jitter of the compensated signal based on the jitter measuring signal. For example, the calculator 48 detects each peak value of the jitter measuring signal, to calculate a timing jitter sequence of the compensated signal. The calculator 48 may calculate the RMS value or peak-to-peak value of the timing jitter sequence.

Having the above-described configuration, the jitter measuring section 24 can easily measure jitter of a data signal, the logical value of which transits at irregular intervals. Therefore, the adaptive equalizer 20 which receives a data signal can be accurately adjusted.

Figure 7:
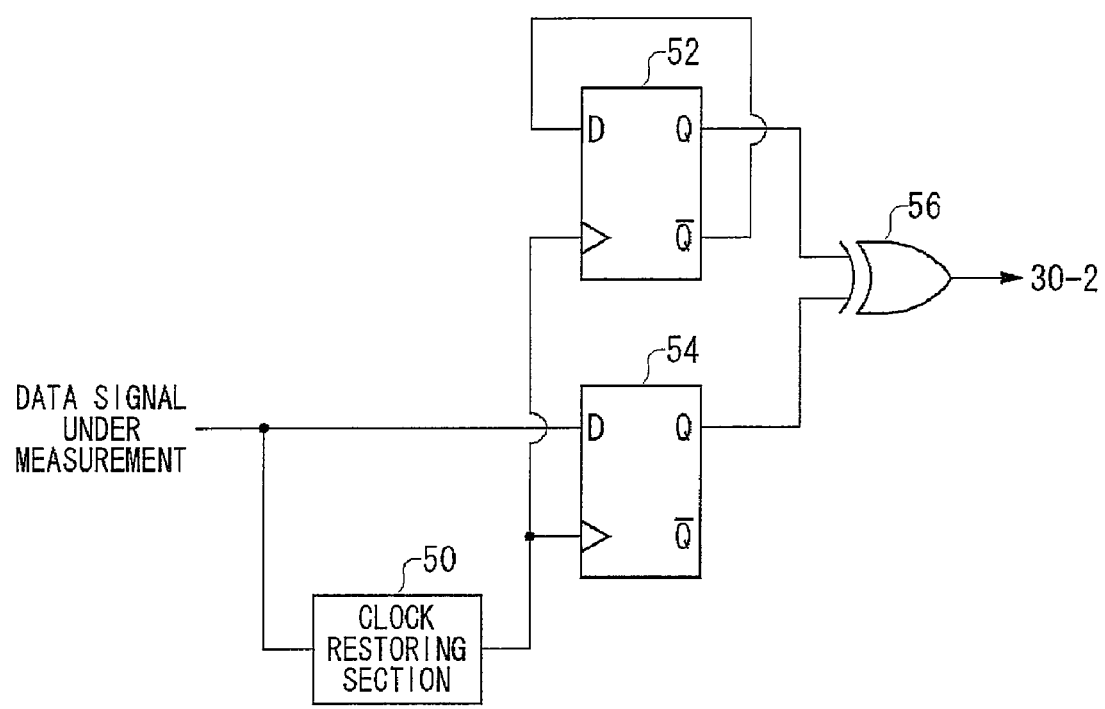
FIG. 7 illustrates an exemplary configuration of the complementary data generating section 28.

FIG. 7 illustrates an exemplary configuration of the complementary data generating section 28. According to this example, the complementary data generating section 28 includes therein a clock recovering section 50, a D flip-flop 52, a D flip-flop 54, and a logical XOR circuit 56.

The clock restoring section 50 generates a clock signal which has a period substantially equal to the data interval of the compensated signal, based on the compensated signal. The D flip-flop 54 receives and outputs the compensated signal in accordance with the clock signal. Referring to the flip-flop 52, the clock signal is input into the clock input terminal, and the inverting output terminal and the data input terminal are connected to each other. Which is to say, the flip-flop 52 generates a signal with the inverted logical value in accordance with the clock signal.

The logical XOR circuit 56 outputs, as the complementary data signal, a logical XOR between the signal output from the D flip-flop 52 and the signal output from the D flip-flop 54. Having the above-described configuration, the complementary data generating section 28 can generate the complementary data signal with a simple configuration.

Figure 8:
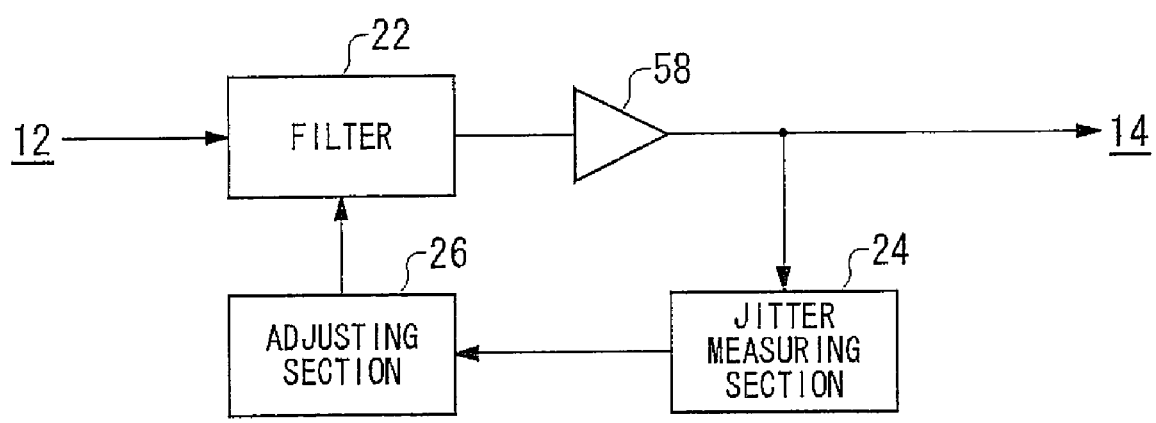
FIG. 8 illustrates another exemplary configuration of the adaptive equalizer 20.

FIG. 8 illustrates another exemplary configuration of the adaptive equalizer 20. According to this example, the adaptive equalizer 20 further includes therein a buffer circuit 58 in addition to the constituents of the adaptive equalizer 20 described with reference to FIG. 2. The buffer circuit 58 eliminates an amplitude-degradation component of the compensated signal output from the filter 22, and inputs the resulting signal into the jitter measuring section 24.

For example, the buffer circuit 58 may be a comparator circuit which outputs the H logic when the level of the compensated signal is higher than a predetermined threshold value, and outputs the L logic when the level of the compensated signal is lower than a predetermined threshold value. Furthermore, the buffer circuit 58 may amplify the compensated signal at a predetermined amplification ratio, and then eliminate a portion of the amplified compensated signal whose signal level is higher than a predetermined limiting value. To be more specific, the buffer circuit 58 may amplify the compensated signal at a predetermined amplification ratio, and then newly generate a compensated signal by replacing a signal level higher than the predetermined limiting value with the predetermined limiting value. Having the above-described configuration, the adaptive equalizer 20 can additionally reduce the amplitude degradation caused by the transmission path 12.

Figure 9:
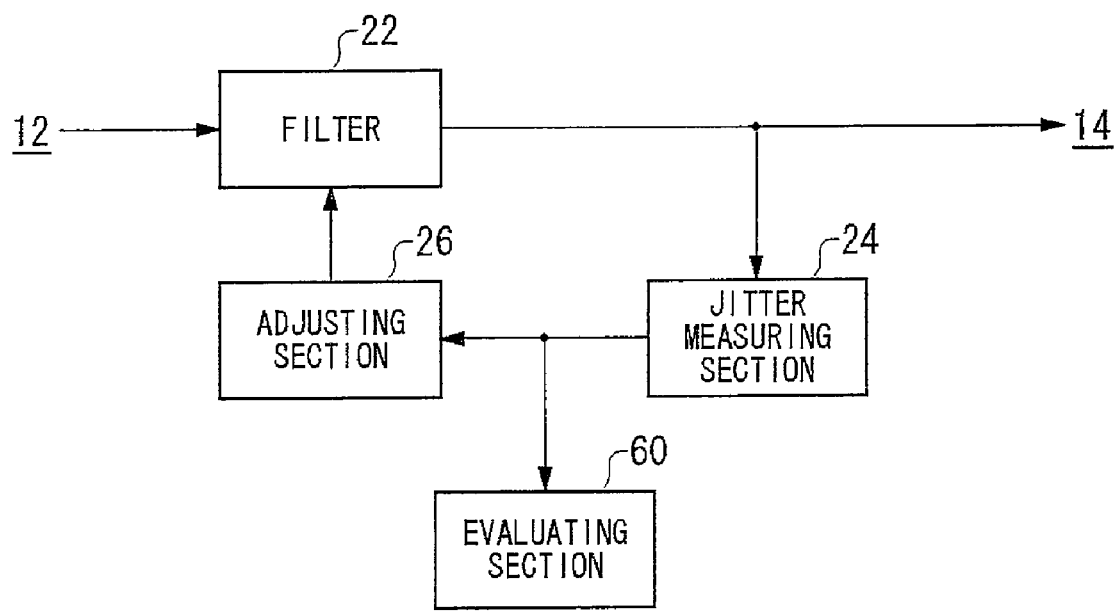
FIG. 9 illustrates another exemplary configuration of the adaptive equalizer 20.

FIG. 9 illustrates another exemplary configuration of the adaptive equalizer 20. According to this example, the adaptive equalizer 20 further includes therein an evaluating section 60 in addition to the constituents of the adaptive equalizer 20 described with reference to FIG. 2 or FIG. 8. In FIG. 9, the adaptive equalizer 20 is configured so as to include therein the evaluating section 60 in addition to the constituents of the adaptive equalizer 20 described in FIG. 2, for example.

The evaluating section 60 evaluates whether the filter 22 correctly operates or not, based on a judgment whether the value of the compensated signal which is measured by the jitter measuring section 24 falls within a predetermined range. The evaluating section 60 may suspend the operation of the communication system 100 when evaluating that the filter 22 is not correctly operating. The evaluating section 60 may instruct the transmitter 10 to perform the signal transmission at a lower frequency. The evaluating section 60 may notify a user or the like that the filter 22 is not correctly operating.

Figure 10:
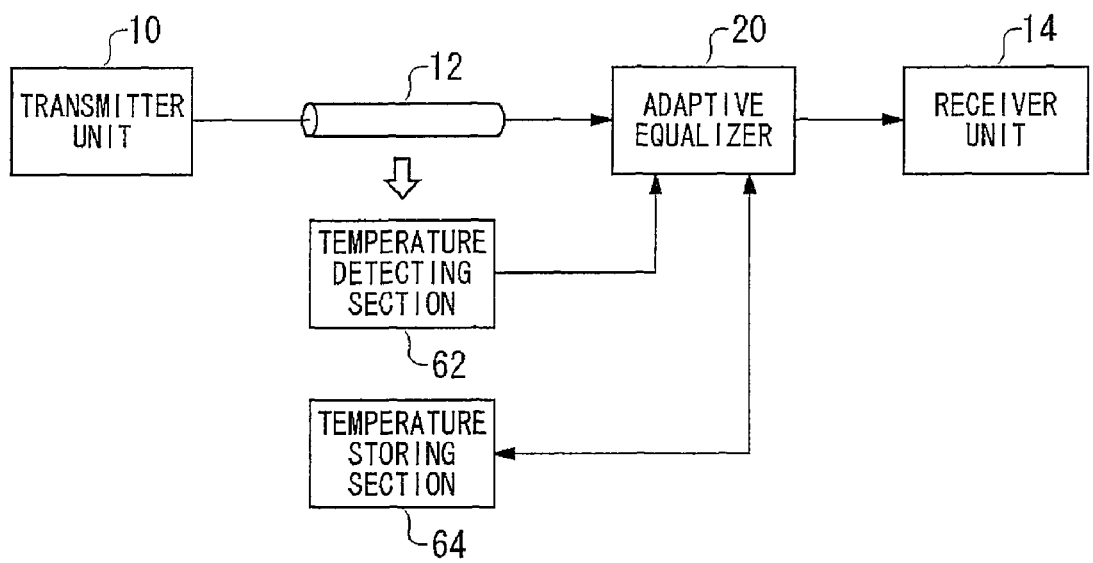
FIG. 10 illustrates another exemplary configuration of the communication system 100.

FIG. 10 illustrates another exemplary configuration of the communication system 100. According to this example, the communication system 100 further includes therein a temperature detecting section 62 and a temperature storing section 64 in addition to the constituents of the communication system 100 described with reference to FIG. 1.

The temperature detecting section 62 detects a temperature of the communication system 100 at a predetermined position. For example, the temperature detecting section 62 may detect the temperature of the transmission path 12 or the temperature of one of the transmitter 10, the adaptive equalizer 20, and the receiver 14. The temperature detecting section 62 may detect the temperatures of more than one position.

For example, the change in the temperature of the transmission path 12 may cause changes in the amplitude and delay characteristics of the transmission path 12. Considering this, the adjusting section 26 of the adaptive equalizer 20 may adjust again the characteristics of the filter 22 when the temperature detected by the temperature detecting section 62 changes by a value equal to or higher than a predetermined value. When the temperature detected by the temperature detecting section 62 changes by a value less than the predetermined value, the adjusting section 26 may not adjust the characteristics of the filter 22.

The temperature storing section 64 stores thereon the temperature detected by the temperature detecting section 62, when the adjusting section 26 adjusts the characteristics of the filter 22. The adjusting section 26 may adjust again the characteristics of the filter 22 when the difference between the temperature detected by the temperature detecting section 62 and the temperature stored on the temperature storing section 64 becomes equal to or higher than the predetermined value.

Figure 11:
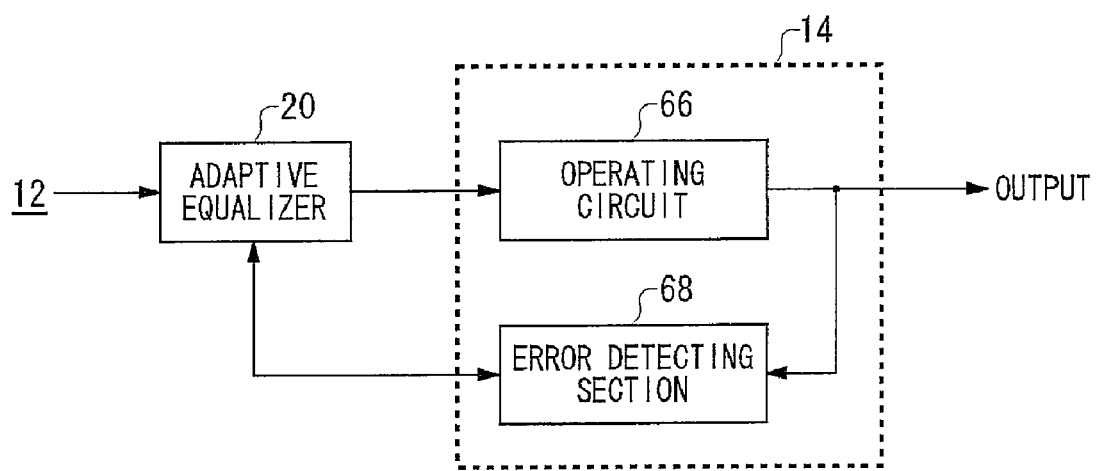
FIG. 11 illustrates another exemplary configuration of the receiver 14.

FIG. 11 illustrates another exemplary configuration of the receiver 14. According to this example, the receiver 14 includes therein an operating circuit 66 and an error detecting section 68. The operating circuit 66 may be a digital circuit which includes, as the input stage, the level comparator 16 described with reference to FIG. 2. The operating circuit 66 operates in accordance with the compensated signal output from the adaptive equalizer 20. For example, the operating circuit 66 may operate in accordance with the logical pattern of the compensated signal, and output an output signal having a logical pattern corresponding to the result of the operation.

The error detecting section 68 detects whether there is an error in the operation of the operating circuit 66. For example, the error detecting section 68 may detect whether there is an error based on the output signal from the operating circuit 66. To be more specific, the error detecting section 68 may detect whether there is an error based on a judgment whether the logical pattern of the output signal matches an expected value pattern corresponding to the logical pattern of the compensated signal.

When there is an error in the operation of the operating circuit 66, one of the possible reasons for the error is the signal degradation caused by the transmission path 12. Therefore, the adjusting section 26 of the adaptive equalizer 20 may adjust the characteristics of the filter 22 when the error detecting section 68 detects an error.

The communication system 100 may operate in a calibration mode in which the characteristics of the filter 22 are adjusted, for example, at the time of the start-up. Furthermore, the communication system 100 may operate in the calibration mode when the temperature changes or the error is detected as described with reference to FIGS. 9 and 10. While the communication system 100 operates in the calibration mode, the transmitter 10 outputs a predetermined adjusting signal. The adjusting section 26 may adjust the characteristics of the filter 22 based on the compensated signal output from the filter 22 in response to the adjusting signal.

The communication system 100 may also operate in an actual operating mode in which the transmitter 10 transmits a data signal to the receiver 14. When the communication system 100 operates in the actual operating mode, the adjusting section 26 may also dynamically adjust the characteristics of the filter 22 based on the compensated signal output from the filter 22 in response to the data signal. Which is to say, the adjusting section 26 may adjust the characteristics of the filter 22 in both of the calibration and actual operating modes.

Note that the adjusting section 26 may adjust the characteristics of the filter 22 in such a manner as to satisfy a condition that the variation in the characteristics of the filter 22 is controlled to be smaller over a unit time when the characteristics of the filter 22 are adjusted during the actual operating mode than when the characteristics of the filter 22 are adjusted during the calibration mode. This feature can prevent a radical change in the characteristics of the filter 22 while the communication system 100 is in the actual operating mode.

Figure 12:
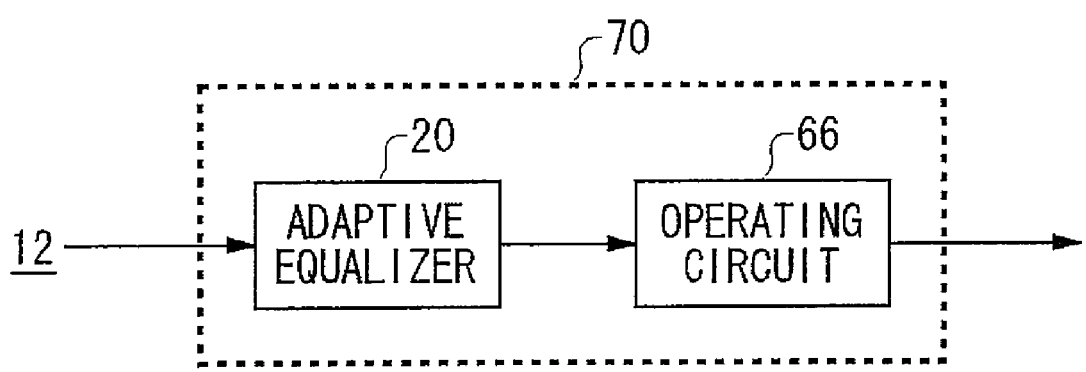
FIG. 12 illustrates another exemplary configuration of the receiver 14.

FIG. 12 illustrates another exemplary configuration of the receiver 14. According to this example, the receiver 14 further includes therein the adaptive equalizer 20 in addition to the constituents of the receiver 14 described with reference to FIG. 2 or FIG. 11. The adaptive equalizer 20 and operating circuit 66 may be disposed on the same circuit board 70 in the receiver 14.

The adaptive equalizer 20 may be the same as the adaptive equalizer 20 described with reference to FIGS. 1 to 11. When the receiver 14 relating to this example is used, it may not be necessary to provide the adaptive equalizer 20 between the transmitter 10 and the receiver 14. This configuration also enables the signal from the transmitter 10 to be input into the operating circuit 66 accurately.

FIGS. 1 to 12 are provided to explain an exemplary case where the signal to be received by the receiver 14 is compensated by the filter 22. In a different exemplary case, a filter may be disposed between the transmitter 10 and the transmission path 12, and enhances in advance the higher-frequency components of the signal output from the transmitter 10. In this case, the jitter measuring section 24 measures the jitter of the signal received by the receiver 14. The adjusting section 26 adjusts the characteristics of the filter provided in the vicinity of the transmitter 10 so as to reduce the jitter measured by the jitter measuring section 24.

Figure 14:
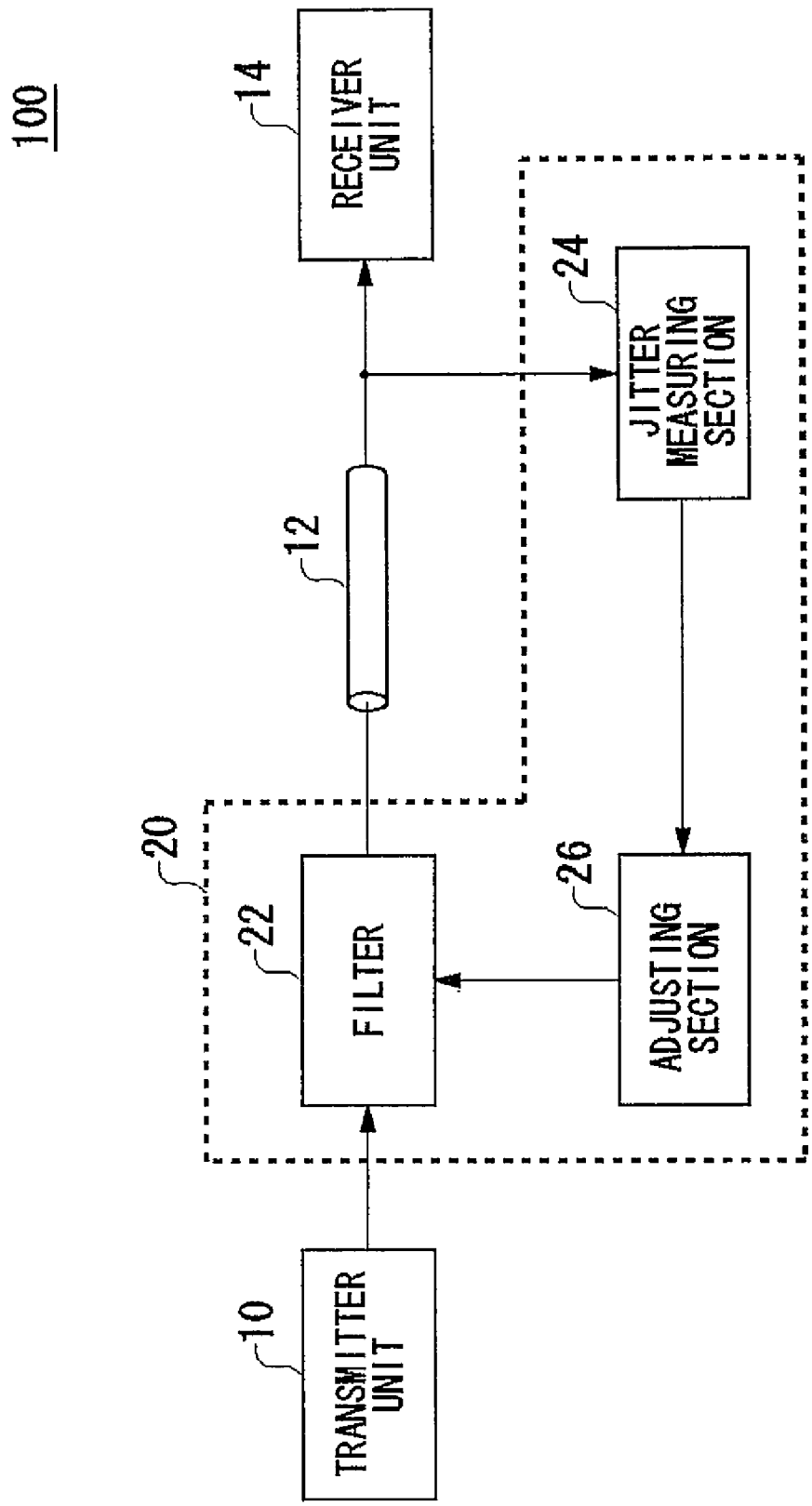
FIG. 14 illustrates an exemplary configuration of the communication system 100 which is configured in such a manner that a filter 22 is provided as an example of a signal compensating section for the output from the transmitter 10.

FIG. 14 illustrates an exemplary configuration of the communication system 100 which is configured in such a manner that the filter 22 is provided as an example of the signal compensating section for the output from the transmitter 10. As mentioned above, the filter 22 is provided between the transmitter 10 and the transmission path 12 in the communication system 100 relating to this example. The adaptive equalizer 20 relating to this example compensates in advance the signal output from the transmitter 10 in terms of the degradation which may be caused by the transmission path 12.

The jitter measuring section 24 measures the jitter of the compensated signal received by the receiver 14. The jitter measuring section 24 may be provided in the vicinity of the input end of the receiver 14. In this case, the jitter measuring section 24 may transmit the result of the measurement, in the form of a digital signal, to the adjusting section 26.

The adjusting section 26 adjusts the characteristics of the filter 22 so as to reduce the jitter of the compensated signal which is measured by the jitter measuring section 24. The adjusting section 26 may be provided in the vicinity of the transmitter 10. With such a configuration, the communication system 100 can accurately compensate in advance the degradation which may be caused by the transmission path 12.

While one aspect of the present invention has been described through the embodiment, the technical scope of the invention is not limited to the above-described embodiment. It is apparent to persons skilled in the art that various alternations and improvements can be added to the above-described embodiment. It is also apparent from the scope of the claims that the embodiment added with such alternations or improvements can be included in the technical scope of the invention.

As is apparent from the above description, the embodiment of the present invention can realize an adaptive equalizer which accurately compensates a loss caused by a transmission path.

What is claimed is:

1. A communication system in which a signal is transferred, comprising:
    a transmitter that transmits a signal;
    a receiver that receives a signal transmitted thereto; and
    an adaptive equalizer that generates a compensated signal by compensating degradation of the signal to be received by the receiver, the adaptive equalizer including:
        a signal compensating section that generates the compensated signal by passing therethrough the signal to be received by the receiver;
        a jitter measuring section that measures jitter of the compensated signal output from the signal compensating section; and
        an adjusting section that adjusts a characteristic of the signal compensating section so as to reduce the jitter of the compensated signal which is measured by the jitter measuring section,
    wherein the communication system operates in (i) an actual operating mode in which a data signal to transmit is transferred and (ii) a calibration mode in which an adjusting signal for calibration is transferred, and
    the adjusting section adjusts the characteristic of the signal compensating section in both of the actual operating and calibration modes, in such a manner as to satisfy a condition that a variation in the characteristic of the signal compensating section is controlled to be smaller over a unit time when the communication system operates in the actual operating mode than when the communication system operates in the calibration mode.

2. The communication system as set forth in claim 1, wherein the adaptive equalizer further includes a buffer circuit that eliminates an amplitude-degradation component of the compensated signal, and inputs the resulting signal into the jitter measuring section.

3. The communication system as set forth in claim 1, further comprising an evaluating section that evaluates the signal compensating section based on a judgment whether a value of the jitter of the compensated signal which is measured by the jitter measuring section falls within a predetermined range.

4. The communication system as set forth in claim 1, wherein
    the receiver includes:
        an operating circuit that operates in accordance with the compensated signal output from the adaptive equalizer; and
        an error detecting section that detects whether an error is present in an operation of the operating circuit, and
    the adjusting section adjusts the characteristic of the signal compensating section when the error detecting section detects that the error is present.

5. A communication system in which a signal is transferred, comprising:
    a transmitter that transmits a signal;

a receiver that receives a signal transmitted thereto; and
an adaptive equalizer that generates a compensated signal by compensating degradation of the signal to be received by the receiver, the adaptive equalizer including:
　　a signal compensating section that generates the compensated signal by passing therethrough the signal to be received by the receiver;
　　a jitter measuring section that measures jitter of the compensated signal output from the signal compensating section; and
　　an adjusting section that adjusts a characteristic of the signal compensating section so as to reduce the jitter of the compensated signal which is measured by the jitter measuring section,
the communication system further comprising:
　　a temperature detecting section that detects a temperature of the communication system at a predetermined position; and
　　a temperature storing section that stores thereon the temperature detected by the temperature detecting section when the adjusting section adjusts the characteristic of the signal compensating section,
wherein the adjusting section adjusts the characteristic of the signal compensating section when a difference between the temperature detected by the temperature detecting section and the temperature stored on the temperature storing section becomes equal to or higher than a predetermined value.

6. The communication system as set forth in claim 5, wherein the adjusting section adjusts the characteristic of the signal compensating section when the temperature detected by the temperature detecting section changes by a value equal to or higher than a predetermined value.

7. A receiver for use in a communication system in which a signal is transferred, the receiver comprising:
an adaptive equalizer that generates a compensated signal by compensating degradation of a received signal; and
an operating circuit that operates in accordance with the adaptive equalizer,
the adaptive equalizer including:
　　a signal compensating section that generates the compensated signal by passing therethrough the received signal;
　　a jitter measuring section that measures jitter of the compensated signal output from the signal compensating section; and
　　an adjusting section that adjusts a characteristic of the signal compensating section so as to reduce the jitter of the compensated signal which is measured by the jitter measuring section,
wherein the communication system operates in (i) an actual operating mode in which a data signal to transmit is transferred and (ii) a calibration mode in which an adjusting signal for calibration is transferred, and
the adjusting section adjusts the characteristic of the signal compensating section in both of the actual operating and calibration modes, in such a manner as to satisfy a condition that a variation in the characteristic of the signal compensating section is controlled to be smaller over a unit time when the communication system operates in the actual operating mode than when the communication system operates in the calibration mode.

8. A communication system in which a signal is transferred, comprising:
a transmitter that transmits a signal;
a receiver that receives a signal transmitted thereto; and
an adaptive equalizer that compensates in advance the signal output from the transmitter in terms of degradation which is to be caused by a transmission path,
the adaptive equalizer including:
　　a signal compensating section that generates a compensated signal by passing therethrough the signal output from the transmitter so as to compensate in advance the degradation;
　　a jitter measuring section that measures jitter of the compensated signal received by the receiver; and
　　an adjusting section that adjusts a characteristic of the signal compensating section so as to reduce the jitter of the compensated signal which is measured by the jitter measuring section,
wherein the communication system operates in (i) an actual operating mode in which a data signal to transmit is transferred and (ii) a calibration mode in which an adjusting signal for calibration is transferred, and
the adjusting section adjusts the characteristic of the signal compensating section in both of the actual operating and calibration modes, in such a manner as to satisfy a condition that a variation in the characteristic of the signal compensating section is controlled to be smaller over a unit time when the communication system operates in the actual operating mode than when the communication system operates in the calibration mode.

9. An adaptive equalizer that generates a compensated signal by compensating degradation of a received signal, the adaptive equalizer comprising:
　　a signal compensating section that generates the compensated signal by passing therethrough the received signal;
　　a jitter measuring section that measures jitter of the compensated signal output from the signal compensating section; and
　　an adjusting section that adjusts a characteristic of the signal compensating section so as to reduce the jitter of the compensated signal which is measured by the jitter measuring section,
wherein a communication system, comprising the adaptive equalizer, operates in (i) an actual operating mode in which a data signal to transmit is transferred and (ii) a calibration mode in which an adjusting signal for calibration is transferred, and
the adjusting section adjusts the characteristic of the signal compensating section in both of the actual operating and calibration modes, in such a manner as to satisfy a condition that a variation in the characteristic of the signal compensating section is controlled to be smaller over a unit time when the communication system operates in the actual operating mode than when the communication system operates in the calibration mode.

10. An adaptive equalizer that generates a compensated signal by compensating in advance degradation of a signal to be transmitted, the adaptive equalizer comprising:
　　a signal compensating section that generates the compensated signal by passing therethrough the signal to be transmitted;
　　a jitter measuring section that measures jitter of the compensated signal received by a receiver; and
　　an adjusting section that adjusts a characteristic of the signal compensating section so as to reduce the jitter of the compensated signal which is measured by the jitter measuring section,
wherein a communication system, comprising the adaptive equalizer, operates in (i) an actual operating mode in which a data signal to transmit is transferred and (ii) a calibration mode in which an adjusting signal for calibration is transferred, and the adjusting section adjusts the characteristic of the signal compensating section in both of the actual operating and calibration modes, in such a manner as to satisfy a condition that a variation in the characteristic of the signal compensating section is controlled to be smaller over a unit time when the communication system operates in the actual operating mode than when the communication system operates in the calibration mode.

* * * * *